(12) United States Patent
Anders et al.

(10) Patent No.: US 10,704,492 B1
(45) Date of Patent: Jul. 7, 2020

(54) PISTON FOR AN INTERNAL COMBUSTION ENGINE

(71) Applicant: Caterpillar Inc., Deerfield, IL (US)

(72) Inventors: Jonathan W. Anders, Peoria, IL (US); Bobby John, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/248,604

(22) Filed: Jan. 15, 2019

(51) Int. Cl.
*F02B 17/00* (2006.01)
*F02F 3/26* (2006.01)
*F02M 61/18* (2006.01)
*F02M 43/04* (2006.01)

(52) U.S. Cl.
CPC ............ *F02F 3/26* (2013.01); *F02M 43/04* (2013.01); *F02M 61/1806* (2013.01)

(58) Field of Classification Search
CPC  F02B 17/005; F02B 23/0648; F02B 23/0651; F02D 2041/389
USPC ............................ 123/295, 298, 193.4–193.6
See application file for complete search history.

(56) References Cited

U.S. PATENT DOCUMENTS

| 8,459,229 | B2 | 6/2013 | Rothbauer et al. | |
|---|---|---|---|---|
| 9,279,361 | B2 | 3/2016 | Rothbauer et al. | |
| 9,611,806 | B2 | 4/2017 | Subatch, Jr. et al. | |
| 9,638,131 | B2 | 5/2017 | Koci et al. | |
| 2012/0255520 | A1* | 10/2012 | Grover, Jr. ............... | F02F 3/28 123/445 |
| 2013/0047950 | A1* | 2/2013 | Eismark ............. | F02B 23/0627 123/193.6 |
| 2015/0275820 | A1* | 10/2015 | Mackey .................. | F02F 3/003 123/445 |
| 2015/0308371 | A1* | 10/2015 | Eismark ............. | F02B 23/0627 123/193.6 |
| 2018/0119637 | A1 | 5/2018 | John et al. | |
| 2018/0283315 | A1* | 10/2018 | John ..................... | F02D 41/402 |

FOREIGN PATENT DOCUMENTS

CN 207420706 U 5/2018

* cited by examiner

*Primary Examiner* — John Kwon
(74) *Attorney, Agent, or Firm* — Bookoff McAndrews (57) ABSTRACT

A piston for an internal combustion engine includes a piston head having a central axis and a top surface. The top surface of the piston includes a piston bowl, a circumferentially extending recess located radially outside the piston bowl, a plurality of diverters located within the recess, and a crown portion located radially outside the recess and extending to an outer surface of the piston.

20 Claims, 7 Drawing Sheets

PISTON FOR AN INTERNAL COMBUSTION ENGINE

TECHNICAL FIELD

The present disclosure relates generally to components of an internal combustion engine, and more particularly, to a piston design for an internal combustion engine.

BACKGROUND

Internal combustion engines are useful in various applications, including propulsion, electricity generation, and operation of heavy machinery. Internal combustion engines include one or more pistons that each reciprocate within a piston cylinder. The motion of the piston is driven by at least one combustion event in a combustion cycle. Internal combustion engines may be designed to run on gasoline fuel, in which a spark plug initiates combustion, or on diesel fuel, that is compression ignited. Engines can also run on dual fuel by combusting two different fuel types in a single combustion cycle.

The use of two fuels in a single combustion cycle can provide benefits by substituting a portion of fuel that may produce greater emissions, or that may have higher cost, with another fuel that may produce fewer emissions and/or have a reduced cost. However, the substitution of a large amount of fuel can lead to incomplete combustion or hot spots in the combustion chamber, which can result in decreased engine performance, greater emissions, and increased wear, among other potential issues. Such dual-fuel systems may be assisted by piston designs that address the unique aspects of combusting two fuels in a single combustion cycle.

An exemplary piston design is disclosed in U.S. Pat. No. 8,459,229 ("the '229 patent") to Rothbauer et al. The '229 patent discloses a piston having a piston bowl including "surface features." The surface features are located at the outer edge of the piston bowl and form a target for fuel spray from an injector. The surface features are intended to reduce soot and improve fuel-air mixing. While the piston surface features described in the '229 patent may be useful in some circumstances, they may be less helpful in other situations. For example, the position and shape of the surface features of the '229 patent may redirect injected fuel upward toward a fuel injector, that could lead to uneven combustion.

The disclosed piston for an internal combustion engine may solve one or more of the problems set forth above and/or other problems in the art. The scope of the current disclosure, however, is defined by the attached claims, and not by the ability to solve any specific problem.

SUMMARY

In one aspect, a piston for an internal combustion engine may include a piston head having a central axis and a top surface. The top surface of the piston may include a piston bowl, a circumferentially extending recess located radially outside the piston bowl, a plurality of diverters located within the recess, and a crown portion located radially outside the recess and extending to an outer surface of the piston.

In another aspect, a piston for an internal combustion engine may include a piston head having a central axis and a top surface. The top surface may include a piston bowl, a circumferentially extending recess located radially outside the piston bowl, and a plurality of diverters located within the recess and configured to circumferentially redirect fuel injections impinging the diverters.

In yet another aspect, a dual-fuel internal combustion engine system may include a piston, the piston including a piston head having a central axis and a top surface. The top surface may include a piston bowl, a circumferentially extending recess located radially outside the piston bowl, a plurality of diverters located within the recess, and a crown portion located radially outside the recess and extending to an outer surface of the piston. The system may also include a fuel injector having injector orifices generally circumferentially aligned with the plurality of diverters.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
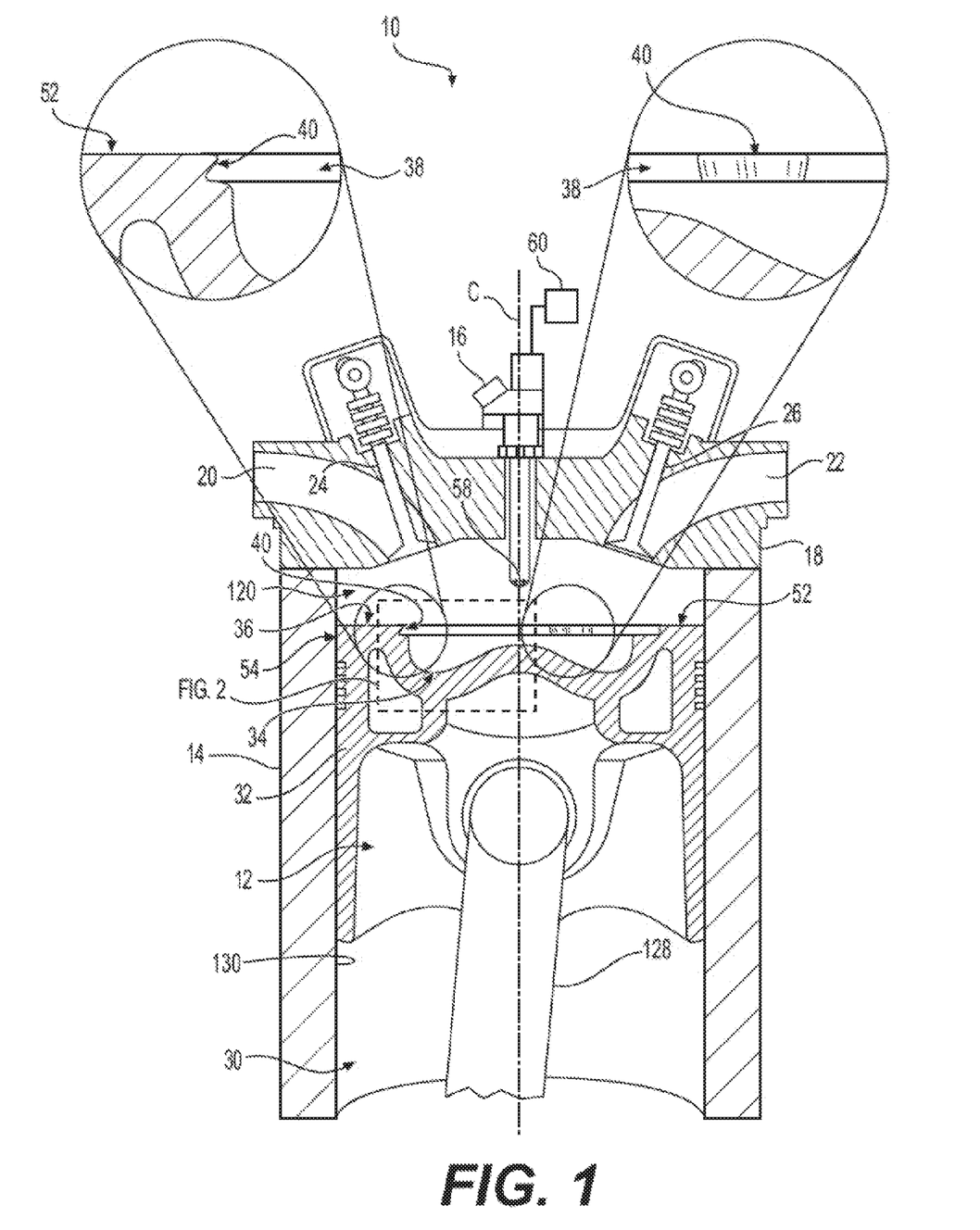
FIG. 1 is a sectional side view of a portion of an internal combustion engine including a piston having a plurality of diverters according to aspects of the disclosure.

FIG. 1 illustrates a sectional view of a portion of an internal combustion engine including a combustion system 10 according to the present disclosure. Combustion system 10 may, for example, be capable of operating in a dual-fuel mode. When combustion system 10 operates in dual-fuel mode, liquid fuel and gaseous fuel can be employed as the two fuels of the dual-fuel mode. In one aspect, diesel fuel may be employed as the liquid fuel and natural gas, or similar gaseous fuel, may be employed as the gaseous fuel. While this disclosure will discuss combustion system 10 in the context of a dual-fuel combustion process, it is understood that the disclosure is not so limited, and that the disclosed combustion system 10 may operate solely with a single fuel, or may include a mode that uses only one type of fuel.

Combustion system 10 includes a piston 12, a piston cylinder 14, and a fuel injector 16. Fuel injector 16 includes a plurality of fuel orifices 58. Combustion system 10 may also includes a cylinder head 18, in which an intake conduit 20 and an exhaust conduit 22 are formed. An intake valve 24 may be supported by cylinder head 18, and may control the opening and closing of intake conduit 20. An exhaust valve 26 may be supported by cylinder head 18, and may control the opening and closing of exhaust conduit 22. A combustion chamber 120 is defined within piston cylinder 14, and between piston 12 and cylinder head 18, to provide the space where combustion occurs when piston 12 is at or near top dead center (TDC).

Cylinder 14 includes a cylinder bore 30 defined by cylinder wall 130. As can be seen in FIG. 1, piston 12 is disposed within cylinder bore 30. Piston 12 includes a piston head 32 pivotably coupled to a connecting rod 128. Connecting rod 128 of piston 12 extends from piston head 32 to a crankshaft (not shown) located below cylinder bore 30 to translate reciprocating motion of piston 12 into rotational motion of the crankshaft. The top surface 36 of piston head 32 includes a piston bowl 34. Piston bowl 34 faces generally upward toward cylinder head 18, and may be of the Mexican Hat bowl design as shown. A central axis C is defined by the center of piston head 32 and passes through a center of piston bowl 34.

With continued reference to FIG. 1, a recess 38 is located radially outward of the piston bowl 34 in piston head 32. Recess 38 may extend circumferentially so as to surround at least a part of piston bowl 34. In one aspect, recess 38 extends circumferentially about the entire perimeter, or 360°, around piston bowl 34. As will be described in more detail below, recess 38 includes a plurality of diverters 40, two of which can be seen in the sectional view of FIG. 1 (and in the enlarged portions of FIG. 1).

A radially outer portion of top surface 36 of piston head 32 forms a crown portion 52. As can be seen in FIG. 1, the crown portion 52 may be formed by a circumferentially extending flat surface that is located radially outward of recess 38 and extending to the radially outer-most surface or side 54 of piston head 32. Thus, crown portion 52 defines a portion of piston head 32 located radially outward of the diverters 40 and radially outward of the recess 38.

Combustion system 10 may include a controller 60, such as an electronic control unit (ECU) configured to monitor and control various operations of combustion system 10. Controller 60 may include a processor configured to receive and process various signals, including a signal indicative of a position of piston 12, e.g., a position with respect to a top-dead-center position of piston 12. Controller 60 may output signals including an injector control signal to control the actuation of fuel injector 16. In one aspect, controller 60 may be included in an engine control module (ECM) configured to monitor and control operations of the entire internal combustion engine. However, controller 60 may alternatively be a fuel system controller for controlling aspect of the fuel system.

Figure 2:
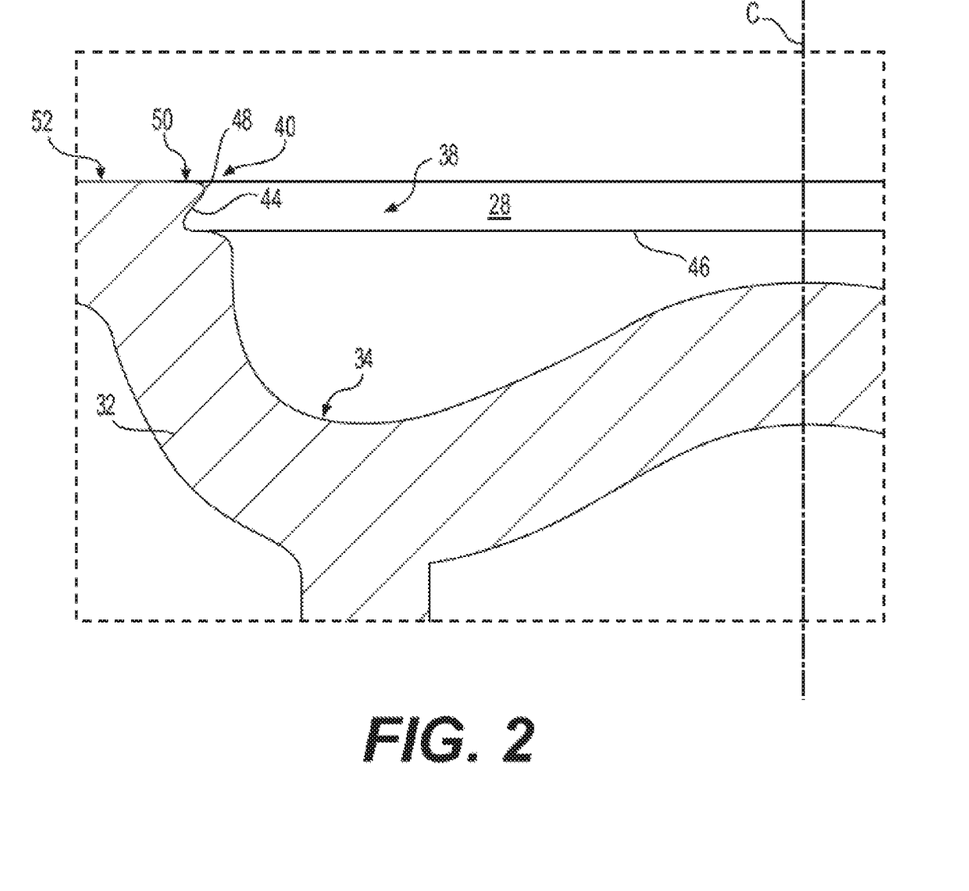
FIG. 2 is an enlarged view of the piston of FIG. 1 including one of the diverters in a recess of the piston.
Figure 3:
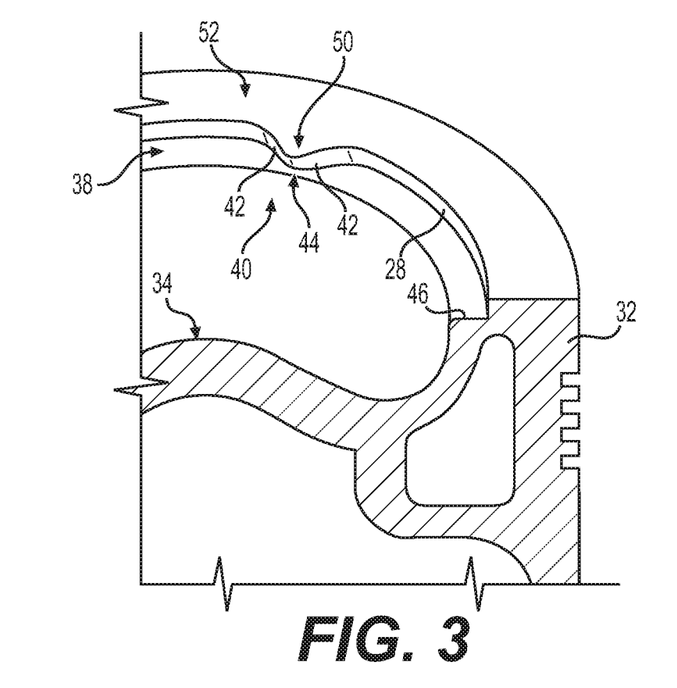
FIG. 3 is a sectional perspective view of one of the diverters of the piston of FIG. 1.

FIGS. 2 and 3 illustrate an enlarged sectional and perspective view, respectively, of the piston head 32 and a diverter 40 within recess 38. Recess 38 may include a circumferentially extending flat side wall 28 and a circumferentially extending flat bottom wall 46. Bottom wall 46 may extend approximately perpendicular to side wall 28 and central axis C. It is understood, however, that side wall 28 and bottom wall 46 may be curved rather than flat, and may form an obtuse or acute angle to each other.

Figure 5:
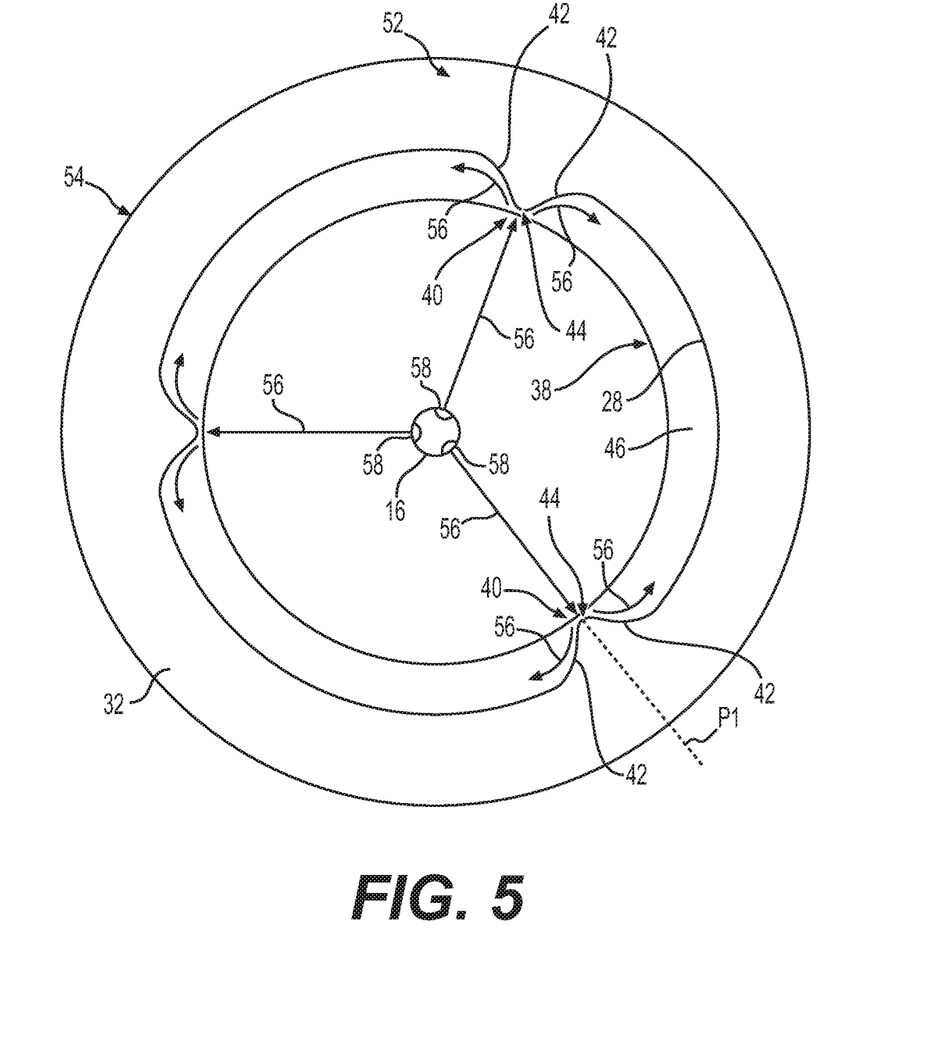
FIG. 5 is a top view of the piston of FIG. 1 illustrating pilot fuel jets injected by a fuel injector and an exemplary arrangement of diverters in the recess of the piston.

Diverter 40 may extend or protrude radially inward from the side wall 28 of recess 38 toward central axis C, and may include a pair of converging side walls 42 (FIG. 3). The converging side walls 42 may be straight or slightly curved (as shown) in a width direction, and may converge to a leading edge 44 centrally located on diverter 40. For example, as shown in FIGS. 3 and 5, converging side walls 42 may flare outward from the leading edge 44 and form concave profiles when viewed from central axis C. Converging side walls 42 and front leading edge 44 may extend in a height direction from the bottom wall 46 of recess 38 to a top surface portion 50 of crown portion 52. Further, diverter 40 may be curved or angled in the height direction. For example, as best shown in FIG. 2, a top portion of the diverter 40 adjacent top surface portion 50 extends radially farther toward central axis C than a bottom portion of the diverter 40 adjacent bottom wall 46, thereby forming a generally acute angle with bottom wall 46. Accordingly, leading edge 44 may terminate at a vertex 48 at a top portion of the diverter 40. However, it is understood that diverter 40 can take alternative shapes, for example, the converging side walls 42 and leading edge 44 may be formed with surfaces extending perpendicular to bottom wall 46, and the height of the diverter 40 may extend less than the height of the sidewall 28 of recess 38.

Vertex 48, like side walls 42 and leading edge 44 of diverter 40, is located inside of recess 38. Further, vertex 48 may be located a top surface portion 50 of crown portion 52 of piston 12. As can be seen in FIG. 2, in one aspect, the top surface of the diverter 40 is coplanar with the top surface 50 of crown portion 52. However, diverter 40 may include a top portion that extends above and/or below the crown portion 52.

Figure 4:
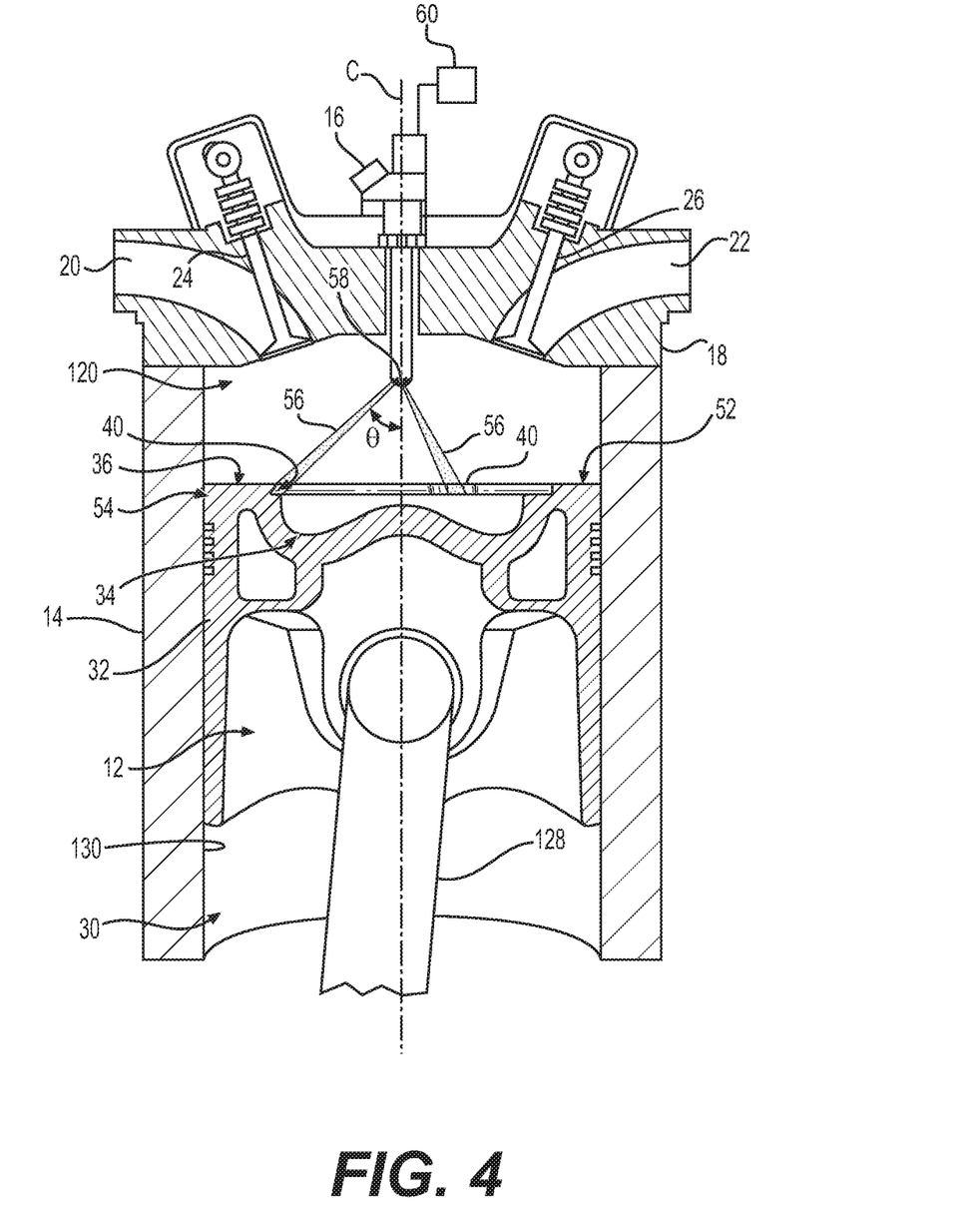
FIG. 4 is a sectional view of the internal combustion engine including the piston of FIG. 1 illustrating an injection of fuel on the diverters.

FIGS. 4 and 5 depict the relationship of the diverters 40 on piston 12, with the orifices 58 of injector 16. Referring to FIG. 5, the side walls 42 of diverters 40 are curved in a symmetric manner with respect to a plane P1 that passes through leading edge 44. Thus, leading edge 44 is disposed at an approximate center of diverter 40 in a circumferential direction. Similarly, top surface portion 50 of each diverter 40 is curved so as to form a convex protrusion when viewed from above.

In an exemplary configuration, each diverter 40 may have an angular or circumferential width of between 30 and 60 degrees, and be spaced approximately 120 degrees from each other. Thus, the diverters 40 may be approximately equally spaced apart. While three diverters 40 are depicted in FIG. 5, two diverters 40, or more than three diverters 40 can be present. When two diverters 40 are present in recess 38, for example, each diverter 40 may be spaced approximately 180 degrees apart. Similarly, four diverters 40 provided in recess 38 may be spaced apart by approximately 90 degrees. As the number of diverters 40 in the recess 38 changes, the circumferential width and the spacing of the diverters 40 may be modified accordingly.

Referring to FIGS. 4 and 5, fuel injector 16 may be approximately centrally disposed with respect to piston head 32. As noted above, fuel injector 16 may include a plurality of fuel orifices 58 that each inject fuel into combustion chamber 120. The number of fuel orifices 58 may be the same as the number of diverters 40 provided in recess 38 of piston 12. Thus, as illustrated in FIG. 5, when three fuel orifices 58 are provided in fuel injector 16, three diverters 40 are provided within recess 38 so that each diverter 40 is circumferentially aligned, or generally circumferentially aligned, with a respective one of the fuel orifices 58. In particular, the leading edge 44 of diverters 40 are circumferentially aligned with a respective fuel orifice 58. As used herein, the phrase "circumferentially aligned with fuel orifices 58" is based on a circumferential position of the central longitudinal axis of the fuel orifice 58 extended in the direction toward the piston 12. This central longitudinal axis of the fuel orifice 58 is depicted in the FIG. 5 as a line representing fuel jet 56. In such an arrangement, the leading edges 44 of diverters 40 are impinged by fuel jet 56 exiting the fuel orifices 58 of fuel injector 16.

Figure 6:
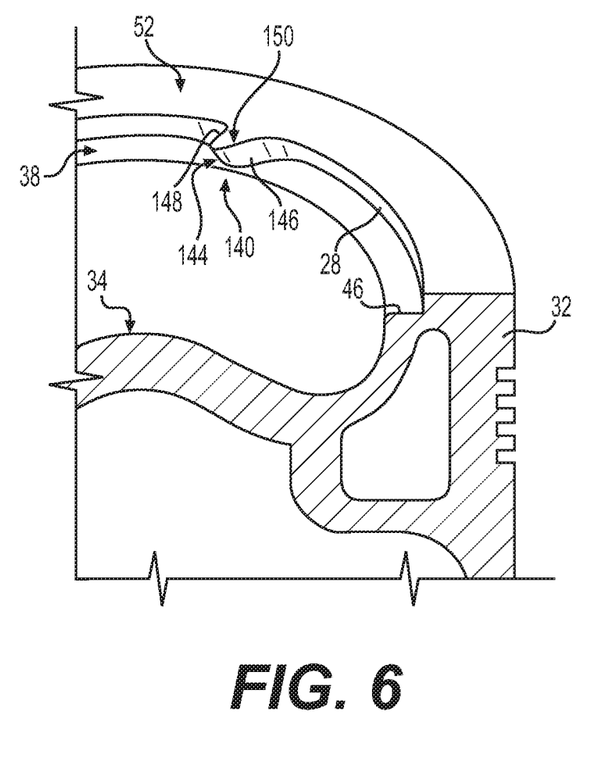
FIG. 6 is a sectional perspective view of an alternative diverter according to aspects of the disclosure.
Figure 7:
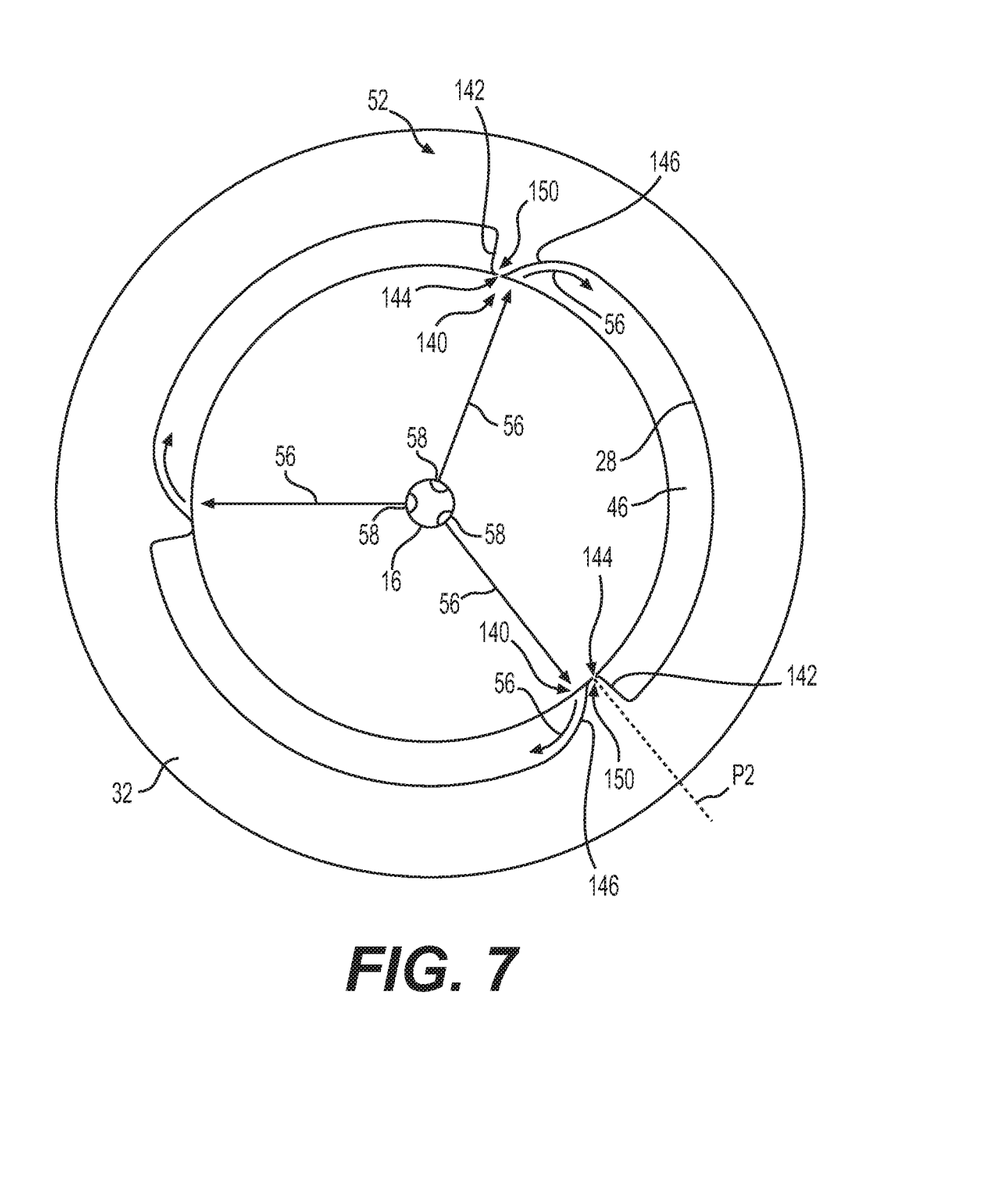
FIG. 7 is a top view of a piston showing an injection of fuel on the alternative diverters of FIG. 6.

An alternative configuration of combustion system 10 is illustrated in FIGS. 6 and 7. FIG. 6 is a perspective view of diverter 140, which, like diverter 40, protrudes from side wall 28 of recess 38. The diverters 140 of this alternative configuration are the same as diverters 40, except that the side walls of diverters 140 include a lead wall 146 and trailing wall 148. As can be seen in FIG. 6, lead wall 146 and trailing wall 148 may have different shapes and thus form an asymmetric diverter 140. Lead wall 146 may be formed so as to include a concave surface in a width direction, and the concave surface faces radially inward. However, alternatively, lead wall 146 may instead be formed with a planar surface. Trailing wall 148 may be approximately straight and extend generally normal (at an angle of approximately 90 degrees) from side wall 28 of recess 38. Trailing wall 148 may be provided at other angles with respect to recess side wall 28 if desired. As shown in FIG. 7, lead wall 146 and trailing wall 148 are asymmetric with respect to a plane P2 (see FIG. 7) that passes through a leading edge 144.

Diverters 140 may include a leading edge 144 formed at a position that is slightly circumferentially offset from fuel orifices 58 and thus do not directly receive an impinging pilot fuel jet 56. Rather, as can be seen in FIG. 7, the leading wall 146 of each of the diverters 140 may be generally circumferentially aligned with a fuel orifice 58 of fuel injector 16 such that pilot fuel jet 56 directly impinges on leading wall 146. Leading wall 146 and trailing wall 142 converge radially inwardly toward each other to leading edge 144. Like diverters 40, the diverters 140 may gradually increase in thickness as it approaches leading edge 144 and a top surface portion 150 of crown portion 52. Also similar to diverters 40, diverters 140 may include three diverters 140 spaced approximately 120 degrees apart, and the same number of diverters 140 as fuel orifices 58 of fuel injector 16. However, more or less diverters 140 may be included on piston 12.

INDUSTRIAL APPLICABILITY

The disclosed aspects of combustion system 10 can be employed in a variety of devices. For example, combustion system 10 may be used in internal combustion engines.

Referring to FIGS. 4 and 5, during operation of combustion system 10, diverters 40 on piston 12 may direct pilot fuel, for example diesel fuel, in a circumferential direction along the recess 38 of piston 12. This circumferential flow of pilot fuel may assist in a robust ignition of the pilot fuel and the main fuel, which may assist in improving emissions, reducing hot spots, and requiring less pilot fuel.

As discussed above, combustion system 10 may operate in dual-fuel mode. Such dual-fuel mode may be for a temporary period, such as a warmup period, or indefinitely. Combustion system 10 may also be capable of operating in a single-fuel mode, for example, a mode in which only diesel fuel is injected. The fuel injected during the single fuel mode may be injected by injector 16, by an additional injector, or a combination of injector 16 and another injector. In one aspect, fuel injector 16 may be a dual-fuel injector that includes a two sets of orifices, for example, a first set of orifices 58 for the injection of pilot liquid fuel, and a second set of orifices for the injection of gaseous fuel, eliminating the need for the introduction of gaseous fuel via an intake port such as intake conduit 20. In this configuration, controller 60 may independently control the injection of fuel by the set of gaseous fuel orifices and the injection of pilot fuel by the set of pilot fuel orifices 58. According to another aspect, during dual-fuel operation, injector 16 may inject pilot fuel jets 56, while a main gaseous fuel is provided to combustion chamber 120 via an intake port such as intake conduit 20.

During operation of combustion system 10 in dual-fuel mode, piston 12 reciprocates within cylinder bore 30 between top-dead-center (TDC) and bottom dead center (BDC). During an intake stroke in which piston 12 moves toward BDC, intake valve 24 opens, allowing intake air enter from intake conduit 20 into combustion chamber 120. This intake air may be mixed with a gaseous fuel, for example natural gas, upstream of combustion system 10 via an intake port injector.

In a compression stroke following the intake stroke, piston 12 moves toward TDC from BDC. Prior to reaching TDC in the compression stroke, fuel injector 16 may inject a plurality of pilot fuel jets 56 at a pilot injection timing (see e.g., FIGS. 4 and 5). Thus, the pilot injection timing may represent the moment at which fuel injector 16 opens to inject pilot fuel. FIG. 4 illustrates the location of pilot fuel jets 56 as these jets 56 impinge on diverters 40, 140 immediately following the pilot injection.

To enable precise control of the timing of injection of pilot fuel, controller 60 monitors the position of piston 12 and controls fuel injector 16 to perform injection of pilot fuel jets 56 at the pilot injection timing. As depicted in FIGS. 4, 5, and 7, each pilot fuel jet 56 injected at the pilot injection timing impinges upon the respective diverters 40, 140. As noted above, in one aspect, the pilot fuel of pilot fuel jets 56 may be diesel fuel.

Controller 60 controls fuel injector 16 to inject the pilot fuel jets 56 at the predetermined pilot injection timing. The pilot fuel timing is a predetermined timing within a range of 60 degrees to 40 degrees before TDC. A pilot spray angle $\theta$ may be defined by the angle between each pilot fuel jet 56 and center axis C. Pilot spray angle $\theta$ is within a range of 60 degrees to 70 degrees.

Each pilot fuel jet 56 is injected by fuel injector 16 toward leading edge 44 and side walls 42 of each diverter 40. As illustrated in FIG. 5, when fuel injector 16 injects pilot fuel jets 56, each fuel jet 56 impinges upon a diverter 40 and is redirected in a circumferential direction, providing a more uniformly distributed pilot fuel in the region of recess 38. The curvature of side walls 42 uses the momentum of the of pilot fuel jets 56 to redirect the pilot fuel jets 56 from a radial direction to a circumferential direction. The curvature of side walls 42 may also reduce momentum loss and allow each pilot fuel jet 56 to gradually transition a radial component to a circumferential component about recess 38. At the center of diverters 40 leading edge 44 receives a respective pilot fuel jet 56 and redirects the fuel jet by separating (or splitting) and redirecting (or diverting) the pilot fuel jet 56 in two opposite circumferential directions. An upper overhang formed by vertex 48 (FIG. 2) may help prevent pilot fuel jets 56 from escaping recess 38 and help retain pilot fuel jets 56 within recess 38. Thus, fuel jets 56 may be directed to be generally retained in the area of recess 38, forming a fuel rich area in this area of recess 38 and in the periphery of combustion chamber 120.

As the compression stroke continues subsequent to the injection of pilot fuel jets 56, pressure within combustion chamber 120 increases, causing pilot fuel jets 56 to undergo compression ignition or autoignition. This autoignition occurs in the region of recess 38 in which pilot fuel is concentrated, igniting the main fuel (gaseous fuel) that is now present within combustion chamber 120.

Operation in the dual-fuel mode is substantially the same when diverters 140 are present. As illustrated in FIG. 7, diverters 140 redirect pilot fuel jets 56. However, this redirection may be along a substantially single circumferential direction, and pilot fuel jets 56 are not as separated or split. When each of the pilot fuel jets 56 is circumferentially redirected by a respective one of the diverters 140, the redirected pilot fuel jets 56 may be generally uniformly distributed about an outer circumference of combustion chamber 120. As noted above, circumferential redirection of fuel jets 56 by diverters 140 may utilize the momentum of the fuel jets 56 to circumferentially distribute the fuel jets 56. As can be seen in FIG. 7, each pilot fuel jet 56 may be redirected in the same circumferential direction (e.g. clockwise). The orientation of the diverters 140 may be reversed such that each pilot fuel jet 56 is redirected in a counter-clockwise direction.

An upper overhang, such as vertex 48, can be included in leading wall 146 of diverters 140, if desired, to further prevent pilot fuel jets 56 from escaping recess 38.

As noted above, the combustion systems 10 disclosed herein may improve uniformity of the pilot fuel autoignition and provide a more robust ignition source, even when a small number of pilot fuel injection orifices and a relatively low amount of pilot fuel is employed. Thus, a more uniform ignition of the main fuel may be achieved. The occurrence of hot spots may be reduced, which may in turn improve emissions performance. Furthermore, an amount of diesel required operate the internal combustion engine may be reduced, and gaseous fuel can be employed as the primary fuel, resulting in reduced emissions and/or cost.

It will be apparent to those skilled in the art that various modifications and variations can be made to the disclosed combustion system without departing from the scope of the disclosure. Other embodiments of the combustion system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A piston for an internal combustion engine, comprising:
   a piston head having a central axis and a top surface, the top surface including:
   a piston bowl;
   a circumferentially extending recess located radially outside the piston bowl;
   a plurality of diverters located within the recess; and
   a crown portion located radially outside the recess and extending to an outer surface of the piston.

2. The piston of claim 1, wherein each diverter includes a pair of side walls that converge toward each other.

3. The piston of claim 2, wherein at least one of the pair of side walls includes a concave surface.

4. The piston of claim 3, wherein the pair of side walls converges to a leading edge.

5. The piston of claim 3, wherein each diverter protrudes from a side wall of the recess toward the central axis of the piston head.

6. The piston of claim 5, wherein the pair of side walls are symmetric to each other about a plane extending through the leading edge.

7. The piston of claim 5, wherein the other of the side walls includes a surface extending generally normal to the side wall of the recess.

8. The piston of claim 1, wherein the diverter includes an overhang portion that overhangs the recess.

9. The piston of claim 1, wherein the plurality of diverters includes three diverters.

10. The piston of claim 9, wherein the diverters are spaced approximately 120 degrees apart with respect to each other.

11. A piston for an internal combustion engine, comprising:
    a piston head having a central axis and a top surface, the top surface including:
    a piston bowl;
    a circumferentially extending recess located radially outside the piston bowl;
    a plurality of diverters located within the recess and configured to circumferentially redirect fuel injections impinging the diverters.

12. The piston of claim 11, wherein each diverter includes a pair of side walls, at least one of each pair of side walls being configured to circumferentially redirect a respective one of the fuel injections.

13. The piston of claim 12, wherein the pair of side walls converge to a leading edge configured to separate the fuel injections impinging the diverters.

14. The piston of claim 13, wherein the leading edge extends from a flat bottom wall of the recess.

15. The piston of claim 12, wherein the diverters protrude from a side wall of the recess toward the central axis of the piston head, and the diverters form a portion of the piston head top surface.

16. A dual-fuel internal combustion engine system, comprising:
    a piston, including:
    a piston head having a central axis and a top surface, the top surface including a piston bowl;
    a circumferentially extending recess located radially outside the piston bowl;
    a plurality of diverters located within the recess; and
    a crown portion located radially outside the recess and extending to an outer surface of the piston; and
    a fuel injector having injector orifices generally circumferentially aligned with the plurality of diverters.

17. The dual-fuel internal combustion engine system of claim 16, wherein each diverter includes a pair of curved side walls.

18. The dual-fuel internal combustion engine system of claim 16, wherein each diverter protrudes from a side wall of the recess toward the central axis of the piston head.

19. The dual-fuel internal combustion engine system of claim 16, wherein the diverters protrude from a side wall of the recess toward the central axis of the piston head, and the diverters form a portion of the piston head top surface.

20. The dual-fuel internal combustion engine system of claim 16, wherein the injector has the same number of fuel orifices as the number of diverters on the piston.

\* \* \* \* \*